United States Patent
Doll

(10) Patent No.: US 7,275,995 B2
(45) Date of Patent: Oct. 2, 2007

(54) ADJUSTABLE GUARD FOR PROTECTING COUPLING CONNECTION BETWEEN ROTATING SHAFTS

(75) Inventor: Ronald J. Doll, Cedarburg, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 688 days.

(21) Appl. No.: 10/430,963

(22) Filed: May 6, 2003

(65) Prior Publication Data

US 2003/0216187 A1   Nov. 20, 2003

Related U.S. Application Data

(60) Provisional application No. 60/380,480, filed on May 15, 2002.

(51) Int. Cl.
*F16D 3/84* (2006.01)
(52) U.S. Cl. .................................... 464/176
(58) Field of Classification Search ............. 220/4.22, 220/4.23, 601, 661, 676, DIG. 21; 464/176; 74/609

See application file for complete search history.

(56) References Cited

U.S. PATENT DOCUMENTS

| | | | | |
|---|---|---|---|---|
| 349,364 | A | * | 9/1886 | Roots ........................ 74/609 |
| 484,970 | A | * | 10/1892 | Momburg et al. ............ 74/609 |
| 1,192,342 | A | * | 7/1916 | Pelton ..................... 464/176 X |
| 2,716,709 | A | * | 8/1955 | Rowe ..................... 220/4.23 X |
| 3,927,578 | A | | 12/1975 | Mattila |
| 4,211,519 | A | * | 7/1980 | Hogan |
| 4,890,731 | A | * | 1/1990 | Mroz ..................... 220/4.22 X |
| 6,190,261 | B1 | | 2/2001 | Powell |

FOREIGN PATENT DOCUMENTS

| | | | |
|---|---|---|---|
| DE | 43 30 423 C1 | 10/1994 | |
| EP | 1 099 901 A2 | 10/2000 | |
| GB | 20526 | * 11/1915 | ................. 464/176 |

* cited by examiner

*Primary Examiner*—G. Binda
(74) *Attorney, Agent, or Firm*—Quarles & Brady LLP

(57) ABSTRACT

An injection molded plastic guard is used to enclose a coupling connection between a prime mover input shaft and a driven output shaft. The guard is comprised of two halves that are hinged together with a stainless steel pin at one end. The coupling is centered within the guard with the hinge being positioned above the coupling. The halves extend from the hinge to distal ends that are pivoted about the pin to surround and enclose the coupling. The distal ends meet underneath the coupling area and are mounted to a non-rotating base. Sleeves extend outwardly from opposing ends of the guard to surround the input and output shafts and abut against the prime mover and output device equipment. The sleeves have a vertically, elongated opening so that one guard can be used to cover many different base-to-shaft heights. Further, the length of the sleeves can be adjusted to accommodate different centerline-of-guard to equipment face distances. End caps are used when these distances are too great or if the equipment face is such that it does not abut appropriately against the respective sleeve. A shaft opening is cut into the end caps at the appropriate base-to-shaft height.

14 Claims, 4 Drawing Sheets

ADJUSTABLE GUARD FOR PROTECTING COUPLING CONNECTION BETWEEN ROTATING SHAFTS

CROSS REFERENCE TO RELATED APPLICATIONS

This application claims priority to U.S. Provisional Application No. 60/380,480, which was filed on May 15, 2002.

BACKGROUND OF THE INVENTION

This invention relates to a protective guard, which is used to surround and substantially enclose a coupling that interconnects a pair of rotating shafts.

A coupling is used to connect a driving shaft from a power source to a driven shaft to operate an output device. For example, an electric motor can be used to power a pump where a motor output shaft is connected to a pump input shaft with a coupling. The output shaft, input shaft, and coupling all rotate together to transfer the power from the electric motor to the pump.

The couplings can be used in a variety of applications and can be subjected to different environmental operating conditions. If external contaminants, such as dirt, water, etc., work their way into the coupling interfaces, accelerated component wear or premature failure could occur. Thus, it is important to keep the rotating components, especially the coupling, protected from external contaminants. Also, for safety reasons, it is important to cover the coupling connection area so that people will not be inadvertently injured by contact with the rotating components.

Protective guards have been used to enclose the coupling area. One type of known guard includes two half shell components made from steel that are attached together at one end underneath the coupling with fastening clips and attached to each other at opposite ends above the coupling with fasteners. Sleeves extend outwardly from opposing sides of the guard to surround the driving and driven shafts.

Traditionally, these guards have been expensive to produce and sometimes difficult to install in certain applications because attaching the halves together requires two separate fastening operations. Another disadvantage with current guards is that a different guard is needed for each different equipment configuration. For example, in one configuration the coupling connection may be positioned equally between the power source and output device while a second configuration requires the coupling connection to be located closer to the power source than the output device. Different guards are needed because different sleeve lengths are needed for each configuration. Requiring a unique guard for each different configurations results in part proliferation, which is undesirable.

Thus, a more cost effective guard is needed, which can be easily installed in all different types of coupling applications and configurations. It is also desirable to provide an adjustable guard so that one guard can be used for many different equipment configurations, in addition to overcoming the other above referenced deficiencies.

SUMMARY OF THE INVENTION

The subject invention provides an adjustable guard assembly that surrounds and encloses a coupling used to interconnect a pair of rotating shafts. A power source with an output shaft is used to drive an input shaft for a machine output device. The input and output shafts are interconnected by the coupling. The guard assembly includes first and second guard halves that are hinged together at one end with opposite ends of the guard halves being pivoted toward each other to surround the coupling. The opposite ends are abutted against each other and are secured to a non-rotating base member.

The guard assembly is made from injection molded plastic. The first and second guard haves include integrally formed alternating hinge knuckles aligned with one another to receive a pin to form a hinge connection. The hinge connection is positioned above the coupling with distal ends of the guard halves being pivoted toward each other underneath the coupling. Each guard half preferably includes integrally molded ribs that provide increased strength and integrally molded slots that provide ventilation and allow visual inspection of the rotating components. Further, each guard half includes integrally molded feet that are used to attach the guard assembly to the non-rotating base member.

Each of the guard halves include first and second sleeve portions that extend outwardly from opposing sides along the direction of the rotating shafts. When the guard halves are pivoted about the coupling and into abutting engagement with each other, the first and second sleeve portions of each guard half are aligned with each other to form first and second sleeves. The sleeves include trim lines that are used to adjust the lengths of the sleeves to accommodate different shaft lengths. The sleeves further include vertically elongated shaft openings that can accommodate different shaft heights. Thus, one guard assembly can be used for many different connection configurations.

Preferably, the first and second sleeves abut against end faces of the power source and machine output device. When the end faces are not configured to allow such an abutment, or if the distances between the guard assembly and the power source and/or machine output device are too great, end caps can be inserted into the elongated shaft openings of the sleeves. A shaft opening can be cut into the end cap at the appropriate shaft height, as determined by the user.

The subject invention provides an improved guard assembly that is easily installed, includes multiple adjustment features to allow a common guard assembly to be used for many different connection configurations, and which is significantly more cost effective than previous designs. These and other features of the present invention can be best understood from the following specification and drawings, the following of which is a brief description.

DETAILED DESCRIPTION OF AN EXEMPLARY EMBODIMENT

Figure 1:
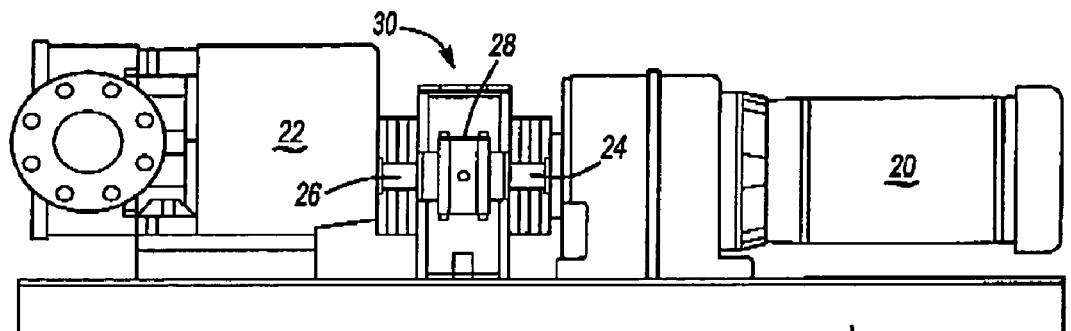
FIG. 1 is a schematic view of a power source and output device interconnected with a coupling that is protected by a guard assembly incorporating the subject invention.

FIG. 1 shows a power source 20 that is used to drive an output device 22. The power source 20 can be an electric motor or other similar prime mover device and includes an output shaft 24 that is coupled to the output device 22. The output device 22 can be a pump, machine, or other similar device, and includes an input shaft 26. A coupling 28 is used to interconnect the output shaft 24 to the input shaft 26 to transfer the driving power from the power source 20 to the output device 22.

Figure 2:
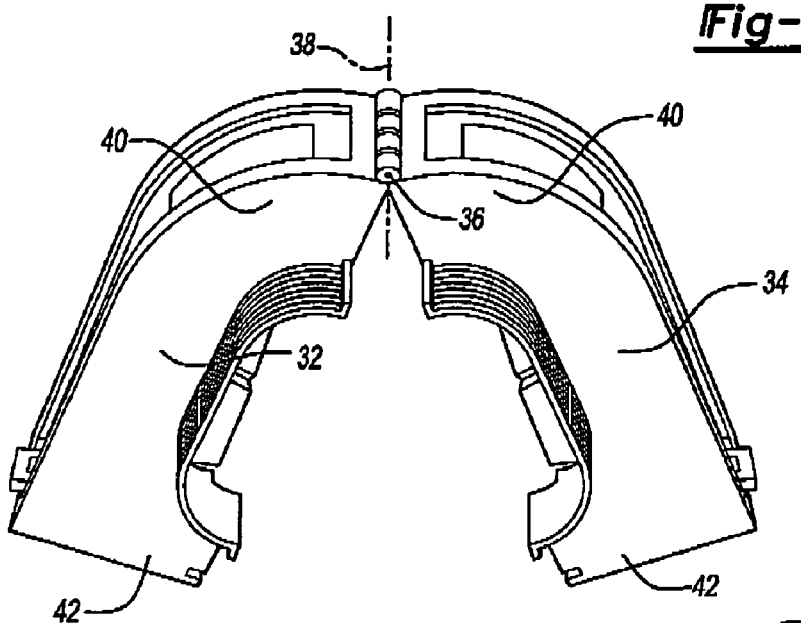
FIG. 2 is a front view of the subject guard assembly showing a pair of guard halves in a non-abutting pre-installation position.

A guard assembly 30 surrounds and encloses the coupling 28. As shown in FIG. 2, the guard assembly 30 includes a first guard half 32 and a second guard half 34 that are interconnected with a pin 36 to define a pivot axis 38. Each guard half 32, 34 includes a pivot end 40 and extends to a distal end 42. During installation, the pivot ends 40 are positioned above the coupling 28 and the distal ends 42 are pivoted towards each other underneath the coupling 28 and are mounted to a non-rotating base member 44 (see FIG. 1).

Figure 3:
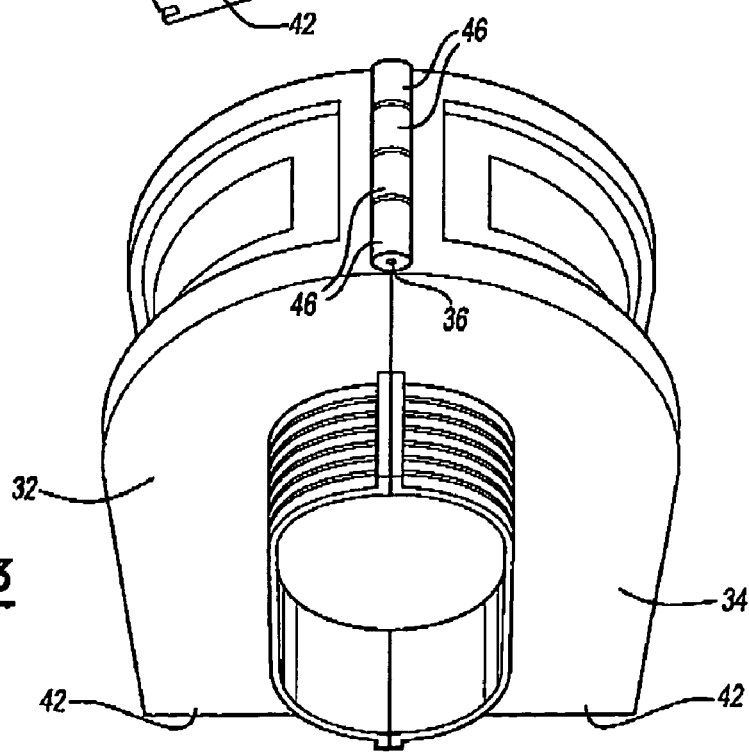
FIG. 3 is a front view of the guard assembly of FIG. 2 showing the guard halves in an abutting relationship.

The guard halves 32, 34 are preferably symmetrical molded halves formed from a plastic material. Preferably the guard halves are made from high-density polyethylene material and are formed in an injection molding process. As shown in FIG. 3, the pivot ends 40 of each half 32, 34 include knuckle portions 46 that are alternated with one another, and which are joined together at the top with the pin 36. The distal ends 42 of the guard halves 32, 34 are pivoted toward each other until they are in abutting engagement. The distal ends 42 preferably include interlocking butt joints for added strength.

Figure 4:
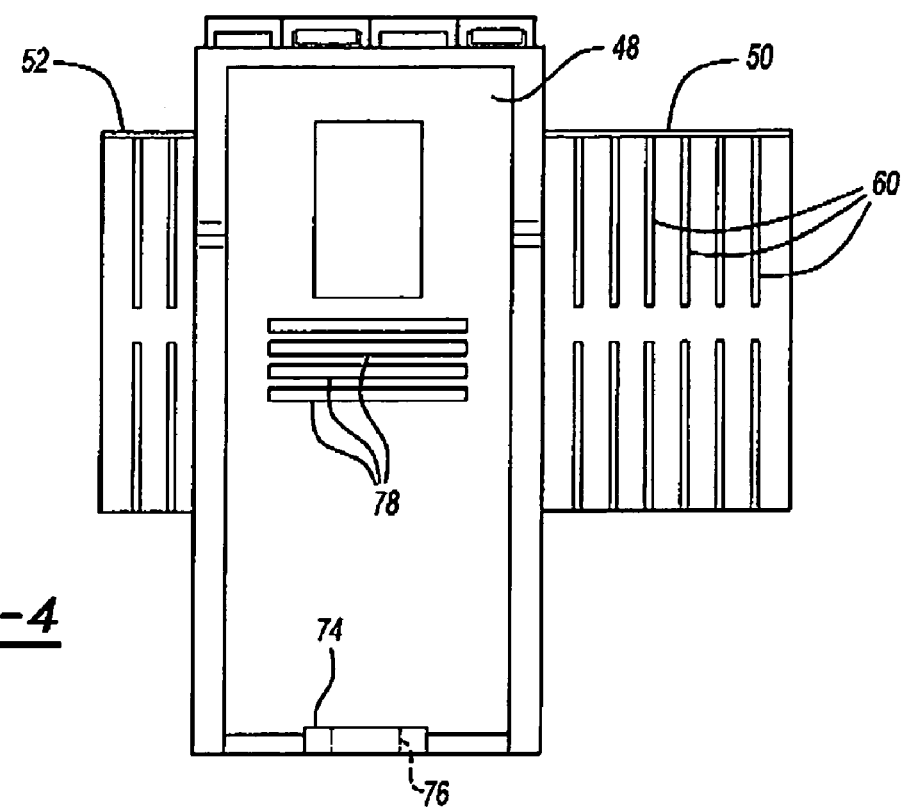
FIG. 4 is a side view of the guard assembly of FIG. 3.

As shown in FIG. 4, each guard half 32, 34 includes a main body portion 48 with a first sleeve portion 50 and a second sleeve portion 52 that extend outwardly from opposing ends of the main body portion 48 in a direction parallel to that of the pivot axis 38. When the guard halves 32, 34 are pivoted toward each other, the first and second sleeve portions 50, 52 from one of the guard halves 32, 34 are aligned with the first and second sleeve portions 50, 52 of the other of the guard halves 32, 34 to form a first sleeve 54 and a second sleeve 56. Also, the guard halves 32, 34 preferably include a finger joint (not shown) that interlocks the guard halves 32, 34 together, once the halves 32, 34 have been pivoted to a final installation position.

Each sleeve 54, 56 includes a plurality of trim lines 60, formed on an external sleeve surface, which are spaced apart from one another by predetermined distances. The trim lines 60 allow the length of the sleeves 54, 56 to be adjusted to accommodate different input and output shaft lengths. Thus, a common guard assembly 30 can be used for many different connection configurations by simply cutting the sleeves 54, 56 along the appropriate trim line 60 to the desired length.

Figure 5:
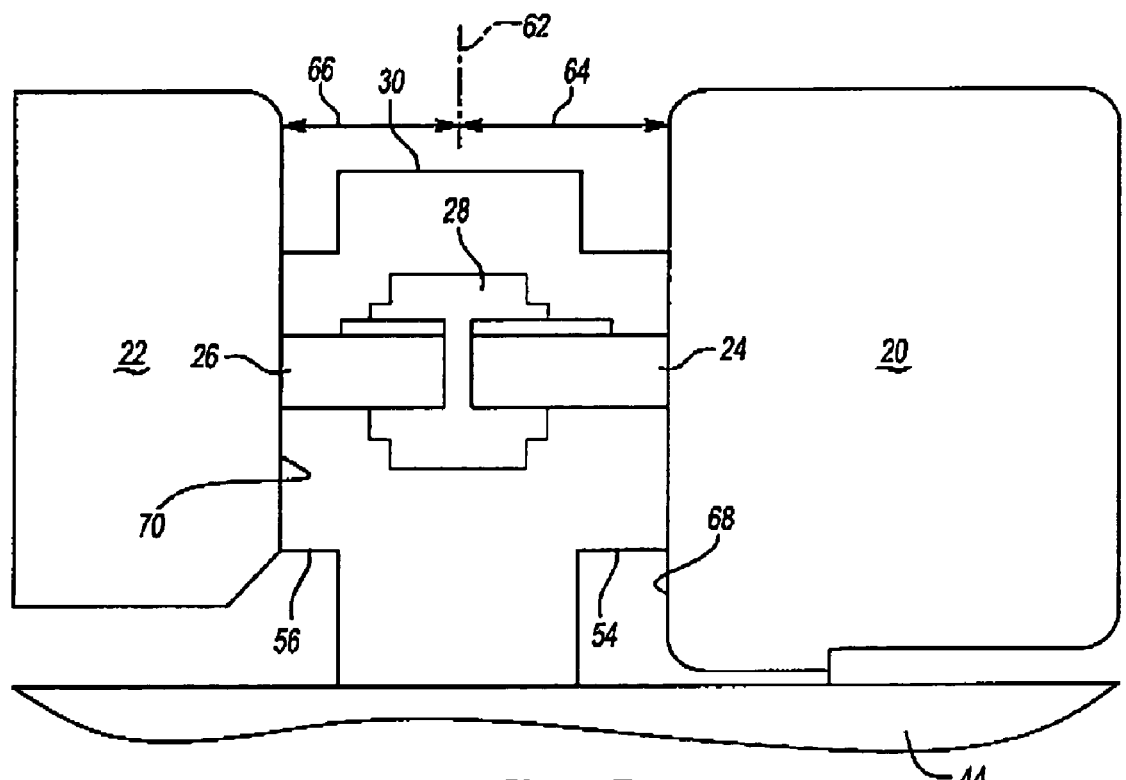
FIG. 5 is a schematic view of the subject guard assembly in an installed position.

As shown in FIG. 5, the first sleeve 54 surrounds the output shaft 24 and the second sleeve 56 surrounds the input shaft 26. Preferably, the coupling 28 is centered within the guard assembly 30 to define a coupling and guard centerline 62. The trim lines 60 are determined by the guard centerline 62 to equipment end face distance. Thus, there is a guard centerline 62 to power source end face distance 64 and a guard centerline 62 to output device end face distance 66. Preferably, the sleeves 54, 56 are cut such that ends of the sleeves 54, 56 abut against an end face 68 of the power source 20 and an end face 70 of the output device 22. This provides complete enclosure of the coupling 28, output shaft 24, and input shaft 26 to protect all rotating components.

Figure 6:
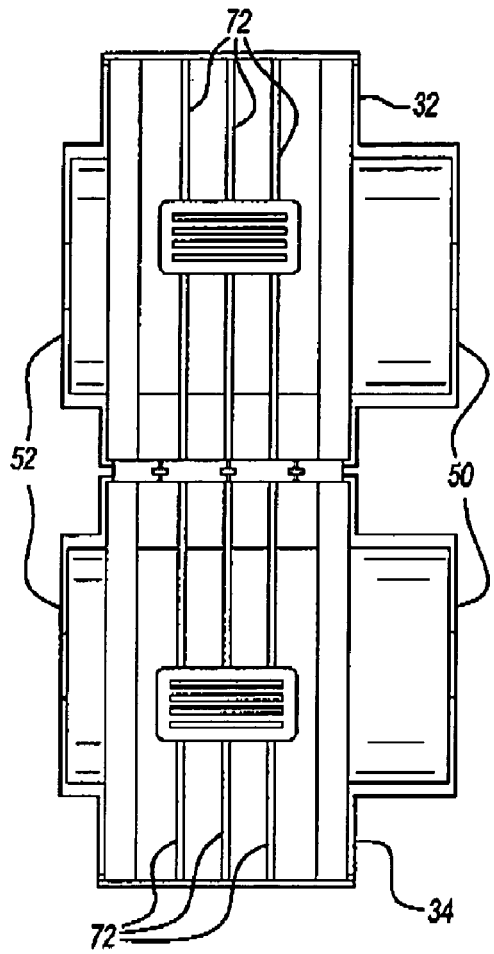
FIG. 6 is a bottom view of the guard assembly of FIG. 4 showing the guard halves pivoted to an open position.
Figure 8:
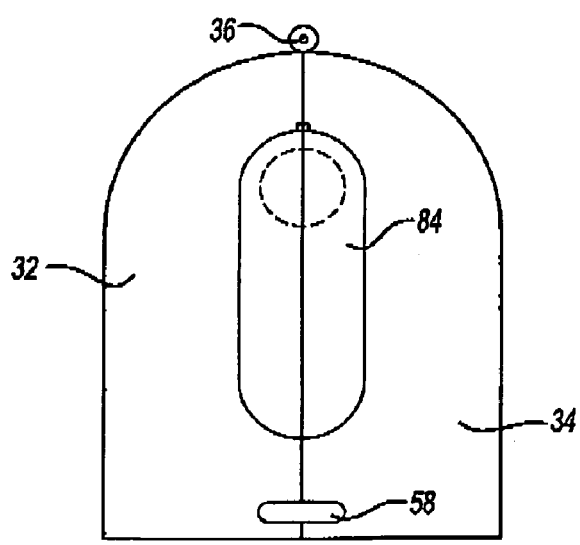
FIG. 8 is an end view of a guard assembly and end cap.

As shown in FIG. 6, each guard half 32, 34 preferably includes integrally molded ribs 72 to increase the overall strength. The ribs 72 can be formed internally or externally on the guard halves 32, 34. Further, the guard halves 32, 34 include integrally molded feet 74 (see FIG. 4) that include openings 76 that receive fasteners (not shown) to secure the halves 32, 34 to the non-rotating base member 44. Slots 78 are formed within the guard halves 32, 34 to provide ventilation and allow visual inspection of the coupling 28. Also as shown in FIG. 8, at least one drain hole 58 is formed within the guard assembly 30. Thus, water, oil, and other fluids, which may enter through the ventilation slots 78, can be easily drained away.

Figure 7:
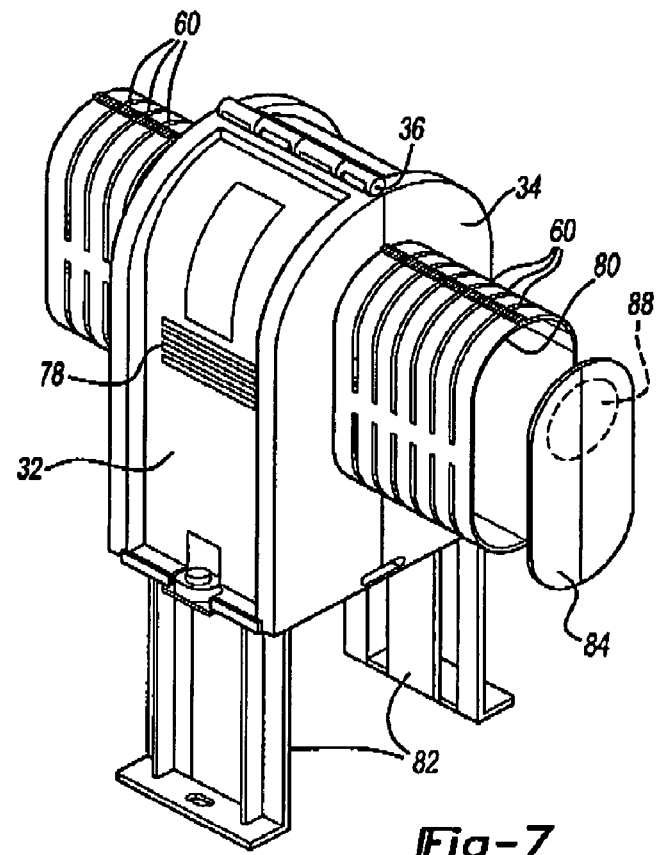
FIG. 7 is a perspective view of the subject guard assembly with risers and an end cap.

Each of the sleeves 55, 56 includes a vertically elongated opening 80, see FIG. 7, to accommodate different shaft-to-base member heights. The vertically elongated openings 80 have a greater height than width. Further, height adjustment can be provided with risers 82.

As discussed above, it is preferable for the ends of the sleeves 54, 56 to engage to the power source and output device end faces 68, 70. However, if either of the end faces 68, 70 of the power source 20 or output device 22 do not provide a flush surface to engage the sleeve ends, or if the distance to the end faces 68, 70 is greater than the sleeve lengths, an end cap 84 can be used to cover the opening 80. As shown in FIG. 8, the end cap 84 is formed with a corresponding vertically elongated shape such that the end cap 84 can be easily installed to over the elongated opening 80. A shaft opening 88 (see FIG. 7) is cut into the end cap 84 to achieve the desired shaft height. As shown, the shaft opening 88 is smaller than the elongated opening 80.

Figure 9:
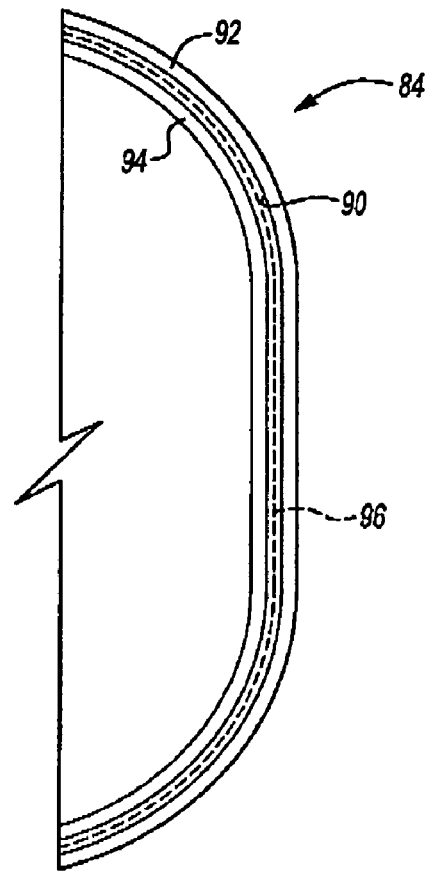
FIG. 9 is an inside view, partially cut away, of the end cap of FIG. 7.
Figure 10:
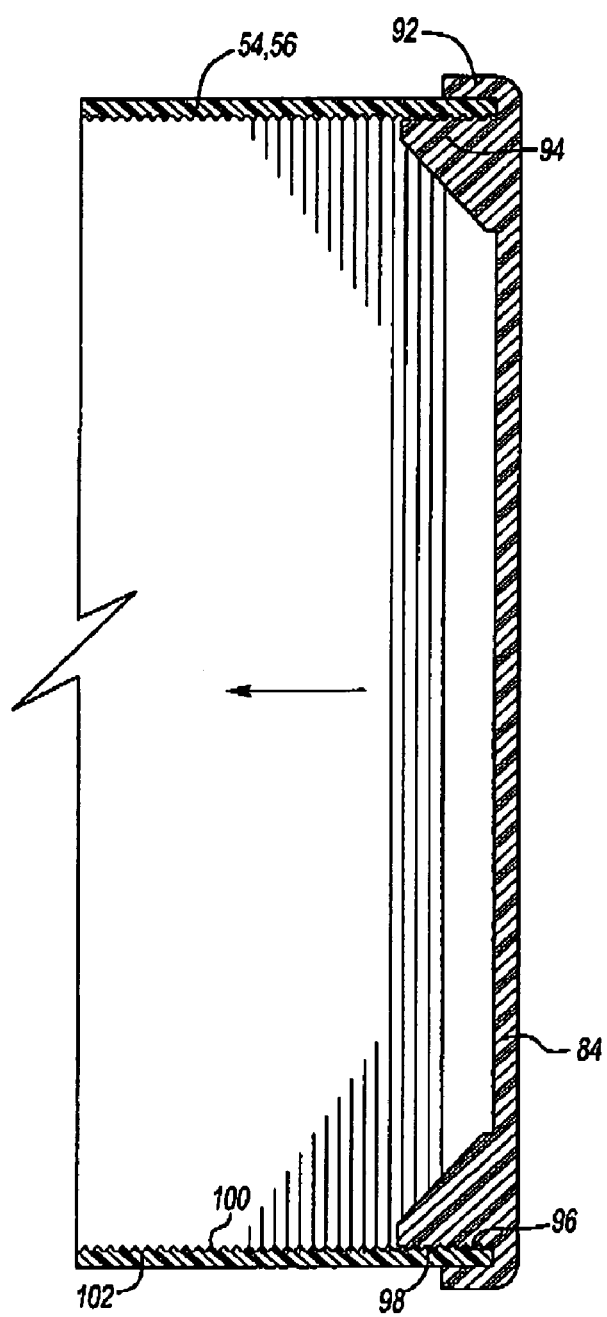
FIG. 10 is a cross-sectional side view of a portion of the guard assembly showing the end cap in an installed position.

The attachment interface for the end cap 84 is shown in FIGS. 9 and 10. The end cap 84 is snapped into place within the elongated opening 80. The cap 84 is only secured to one of the sleeve portions 50, 52 of one of the guard halves 32, 34 such that the guard assembly 30 can be opened without requiring end cap 84 removal. The end cap 84 includes a groove 90 formed between an outer flange 92 and an inner flange 94.

Figure 11:
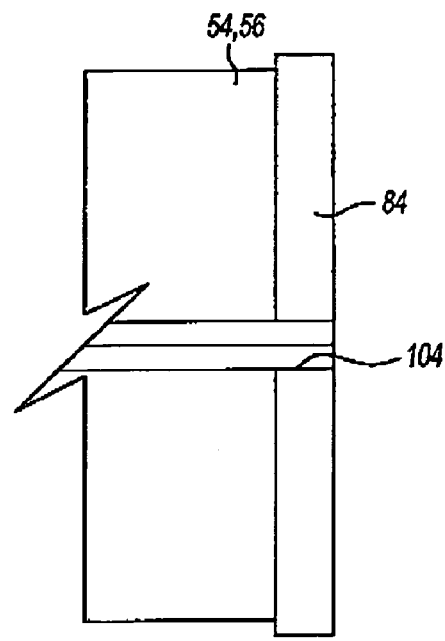
FIG. 11 is a side view of the guard assembly of FIG. 10 without the end cap.

A plurality of extensions 96 is formed on an inner flange surface 98 of the groove 90 and a plurality of locking fingers 100 is formed on an inner surface 102 of the sleeves 54, 56. The locking fingers 100 extend substantially along the length of the sleeves 54, 56 such that when the sleeves 54, 56 are trimmed to any length the locking fingers 100 will be able to engage the extensions 96. As shown in FIG. 11, the cap 84 pushes off an extension flange 104 on the sleeves 54, 56 to force the extensions 96 and locking fingers 100 to interlock.

This unique guard assembly 30 provides a pivoting configuration that is easily installed, includes multiple adjustment features to allow a common guard assembly 30 to be used for many different connection configurations, and which is significantly more cost effective than previous designs. The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

I claim:

1. A guard assembly for protecting a coupling connection between a pair of rotating shafts comprising:
   a first guard half partially surrounding a first portion of a coupling interconnecting a pair of rotating shafts, said first guard half having a first end positioned on one side of the coupling and a second end positioned on an opposite side of the coupling; and
   a second guard half partially surrounding a section portion of the coupling, said second guard half having a first end positioned on said one side of the coupling and a second end positioned on said opposite side of the coupling wherein said first ends of said first and second guard halves are pivotally attached to each other with a pin to allow said second ends of said first and second guard halves to be pivoted into abutting engagement with each other to substantially surround and enclose the coupling;
   said first guard half including a first central body with a first set of sleeve portions extending outwardly in opposing directions from said first central body and said second guard half including a second central body with a second set of sleeve portions extending outwardly in opposing directions from said second central body with said first set of sleeve portions being positioned in alignment with said second set of sleeve portions to form first and second sleeves that substantially surround both rotating shafts; and
   wherein said first and second sleeves have adjustable lengths to accommodate different rotating shaft lengths.

2. The assembly set forth in claim 1 wherein said second ends of said first and second guard halves are mounted to a non-rotating base member.

3. The assembly set forth in claim 1 wherein said first and second guard halves are formed from a plastic material.

4. The assembly as set forth in claim 1 wherein said first and second guard halves include a plurality of integrally molded ribs.

5. The assembly as set forth in claim 1 wherein said first and second sleeves have an outer surface and an inner surface and wherein a plurality of trim line surfaces are formed on said outer surface with each trim line surface being spaced apart from an adjacent trim line surface by a predefined distance to define the adjustable lengths to accommodate different rotating shaft lengths.

6. A guard assembly for protecting a coupling connection between a pair of rotating shafts comprising:
   a first guard half partially surrounding a first portion of a coupling interconnecting a pair of rotating shafts, said first guard half having a first end positioned on one side of the coupling and a second end positioned on an opposite side of the coupling; and
   a second guard half partially surrounding a second portion of the coupling, said second guard half having a first end positioned on said one side of the coupling and a second end positioned on said opposite side of the coupling wherein said first ends of said first and second guard halves are pivotally attached to each other with a pin to allow said second ends of said first and second guard halves to be pivoted into abutting engagement with each other to substantially surround and enclose the coupling;
   wherein said first guard half includes a first central body with a first set of sleeve portions extending outwardly in opposing directions from said first central body and said second guard half includes a second central body with a second set of sleeve portions extending outwardly in opposing directions from said second central body with said first set of sleeve portions being positioned in alignment with said second set of sleeve portions to form first and second sleeves that substantially surround both rotating shafts; and
   wherein said first and second sleeves define elongated openings having a greater height than width to accommodate different shaft heights.

7. The assembly set forth in claim 6 including at least one end cap mounted to cover one of said elongated openings, said end cap including a shaft opening that is smaller than said elongated opening.

8. The assembly as set forth in claim 7 wherein said end cap grippingly engages at least one of said first and second sleeves to define a snap attachment.

9. A guard assembly for protecting a coupling connection between a pair of rotating shafts comprising:
   a first guard half partially surrounding a first portion of a coupling interconnecting a pair of rotating shafts, said first guard half having a first end positioned on one side of the coupling and a second end positioned on an opposite side of the coupling;
   a second guard half partially surrounding a second portion of the coupling, said second guard half having a first end positioned on said one side of the coupling and a second end positioned on said opposite side of the coupling wherein said first ends of said first and second guard halves are pivotally attached to each other with a pin to allow said second ends of said first and second guard halves to be pivoted into abutting engagement with each other to substantially surround and enclose the coupling;
   wherein said first guard half includes a first central body with a first set of sleeve portions extending outwardly in opposing directions from said first central body and said second guard half includes a second central body with a second set of sleeve portions extending outwardly in opposing directions from said second central body with said first set of sleeve portions being positioned in alignment with said second set of sleeve portions to form first and second sleeves that substantially surround both rotating shafts;
   wherein said first and second sleeves define elongated openings having a greater height than width to accommodate different shaft heights; and
   at least one cap mounted to cover one of said elongated openings, said end cap including a shaft opening that is smaller than said elongated opening wherein said first and second sleeves are each defined by an outer surface and an inner surface with a plurality of extensions being formed about at least a portion of the circumference of the inner surface and extending along a majority of the length of the inner surface and wherein said end cap includes an inwardly facing groove having a plurality of locking fingers formed about at least a portion of a groove surface, said locking fingers engaging said extensions to retain said end cap on one sleeve.

10. A guard assembly for protecting a coupling connection between a pair of rotating shafts comprising:
    a first guard portion partially surrounding a coupling interconnecting a pair of rotating shafts, said first guard portion having a first end positioned on one side of the coupling and a second end positioned on an opposite side of the coupling;

a second guard portion partially surrounding the coupling, said second guard portion having a first end positioned on said one side of the coupling and a second end positioned on said opposite side of the coupling wherein said first ends of said first and second guard portions are pivotally connected to allow said second ends of said first and second guard portions to be pivoted adjacent to each other to substantially surround and enclose the coupling;

wherein said second ends of said first and second guard portions include a base mount portion adapted for attachment to a base member; and wherein said first guard portion includes a first set of opposing sleeve portions and said second guard portion includes a second set of opposing sleeve portions with said first set of opposing sleeve portions being positioned in alignment with said second set of opposing sleeve portions to form first and second sleeves that substantially surround both rotating shafts and wherein said first and second sleeves define vertically elongated openings to accommodate different shaft heights.

11. The assembly as set forth in claim 10 wherein said first and second sleeves have an outer surface and an inner surface and wherein a plurality of trim line surfaces are formed on said outer surface with each trim line surface being spaced apart from an adjacent trim line surface by a predefined distance to define a plurality of sleeve lengths to accommodate different rotating shaft lengths.

12. A guard assembly for protecting a coupling connection between a pair of rotating shafts comprising:

a first guard portion partially surrounding a coupling interconnecting a pair of rotating shafts, said first guard portion having a first end positioned on one side of the coupling and a second end positioned on an opposite side of the coupling;

a second guard portion partially surrounding the coupling, said second guard portion having a first end positioned on said one side of the coupling and a second end positioned on said opposite side of the coupling wherein said first ends of said first and second guard portions are pivotally connected to allow said second ends of said first and second guard portions to be pivoted adjacent to each other to substantially surround and enclose the coupling;

wherein said second ends of said first and second guard portions include a base mount portion adapted for attachment to a base member; and at least one end cap received within one vertically elongated opening to define a snap attachment.

13. The assembly as set forth in claim 12 including a shaft opening cut into said end cap at a desired shaft height.

14. The assembly as set forth in claim 13 wherein each end cap can accommodate multiple shaft heights.

* * * * *